United States Patent [19]

Okaniwa et al.

[11] 3,948,598

[45] Apr. 6, 1976

[54] BLACK-DYEING PROCESS OF BASIC DYEABLE POLYESTER FIBERS

[75] Inventors: Tetsuo Okaniwa, Minoo; Sadaharu Abeta, Toyonaka, both of Japan

[73] Assignee: Sumitomo Chemical Co., Ltd., Osaka, Japan

[22] Filed: June 3, 1974

[21] Appl. No.: 476,001

[30] Foreign Application Priority Data

June 1, 1973 Japan.................................. 48-62210
July 26, 1973 Japan.................................. 48-84755

[52] U.S. Cl................................ 8/41 C; 8/26; 8/168 C
[51] Int. Cl.² C09B 27/00; C09B 45/48; D06P 5/00
[58] Field of Search......................... 8/26, 41 C, 168

[56] References Cited
UNITED STATES PATENTS

| 3,413,075 | 11/1968 | Rotcop | 8/26 |
| 3,874,847 | 4/1975 | Ohkawa et al. | 8/41 C |

FOREIGN PATENTS OR APPLICATIONS

| 751,150 | 1/1951 | United Kingdom | 8/177 AB |
| 1,083,000 | 6/1960 | Germany | |
| 1,044,023 | 11/1958 | Germany | |
| 1,077,808 | 3/1960 | Germany | |
| 1,050,940 | 2/1959 | Germany | |
| 1,011,396 | 7/1957 | Germany | |
| 7,115,791 | 4/1971 | Japan | |

Primary Examiner—Donald Levy
Assistant Examiner—A. L. Clingman
Attorney, Agent, or Firm—Sughrue, Rothwell, Mion, Zinn & Macpeak

[57] ABSTRACT

Basic dyeable polyester fibers are dyed with a mixture of dyes, the first of which is a quaternized-2-methylene indoline coupled to a substituted aminobenzene to form a hydrazide dye, the second of which is a quaternized amino triazol azo coupled to substituted diaminobenzene. The third dye is a quaternized alkoxybenzothiazol azo coupled to a substituted Di-Aminobenzene. The fourth dye is a substituted diaminotriphenyl methane dye and the last dye is a Nitrobenzeneazo-substituted aminobenzene.

8 Claims, No Drawings

BLACK-DYEING PROCESS OF BASIC DYEABLE POLYESTER FIBERS

BACKGROUND OF THE INVENTION

1. FIELD OF THE INVENTION

The present invention relates to a process of dyeing polyester fibers which have been modified so that they can be dyed with cationic dyes and more particularly the invention relates to a process of dyeing the modified polyester fibers black using a dyeing bath containing a specific combination of dyes.

2. DESCRIPTION OF THE PRIOR ART

Polyester fibers have been used widely as synthetic fibers having excellent properties for cloth but it has been difficult to dye such fibers a clear and deep color.

Of the various kinds of dyes, cationic dyes for polyacrylonitrile fibers give the most brilliant and deep color and various investigations have been made for modifying polyester fibers so that such fibers become cationic dye-dyeable and can be dyed brilliant and deep colors. As one result of these investigations, Japanese Pat. No. 10497/59 discloses that polyester fibers can be modified for this purpose by copolymerizing them with sulfoisophthalic acid as an acid material.

However, when such modified polyester fibers are dyed with commercially available cationic dyes for polyacrylonitrile fibers, it is difficult to dye the fibers a deep black since modified polyester fibers are very poor in exhaustion for, in particular, black dyes. Furthermore, when yarn fabrics of blends of the basic dyeable polyester fibers with another kind or kinds of fibers are dyed, the fibers other than the polyester fibers are greatly stained.

That is, commercially available black dye compositions of cationic dyes for polyacrylonitrile fibers include the following combinations of dyes:

Dye Combination (1):

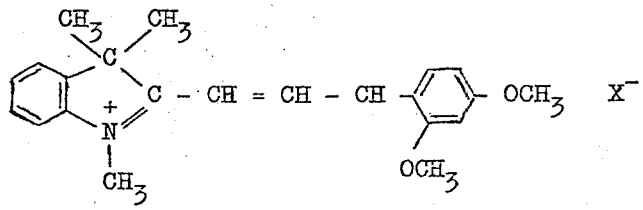

,

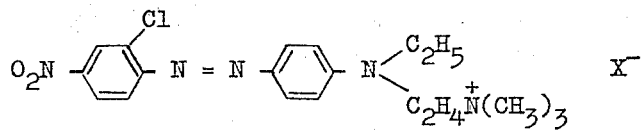

,

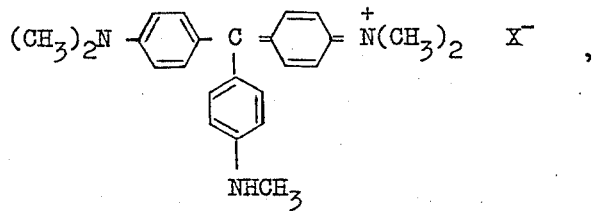

,

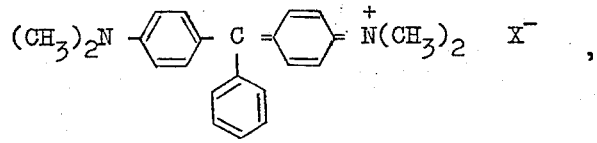

, and

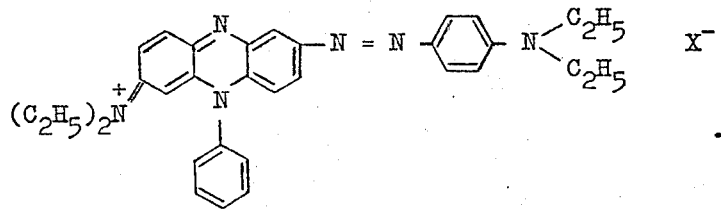

.

Dye Combination (2):
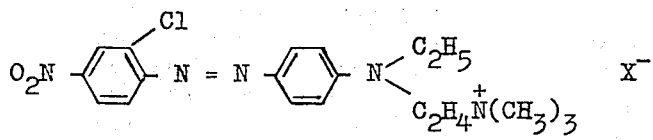
and
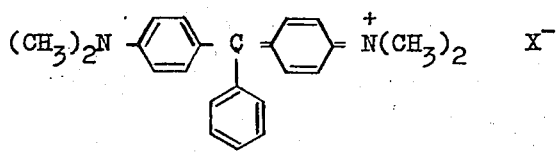
Dye Combination (3):
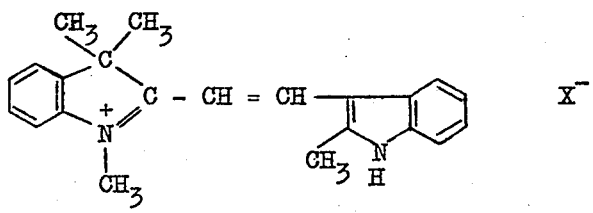
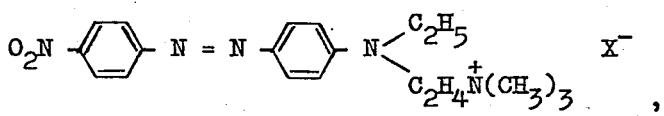
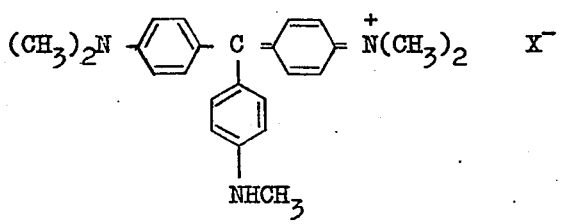
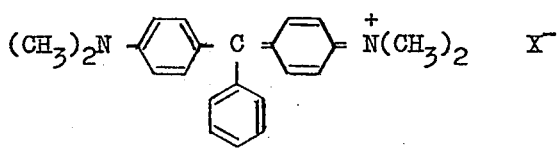
and
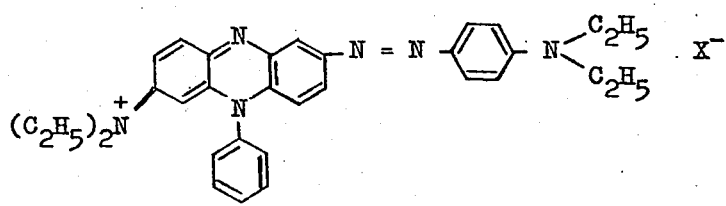

Dye Combination (4):
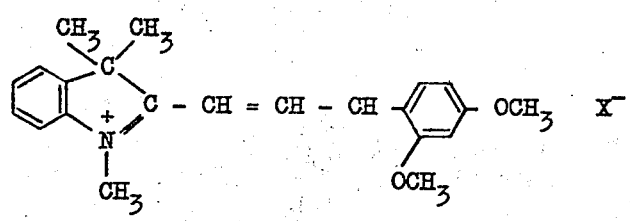
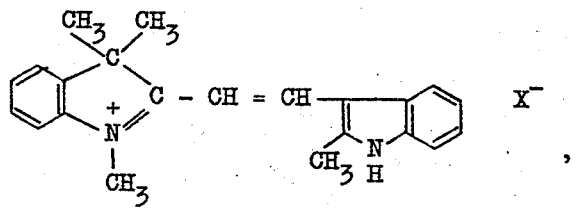
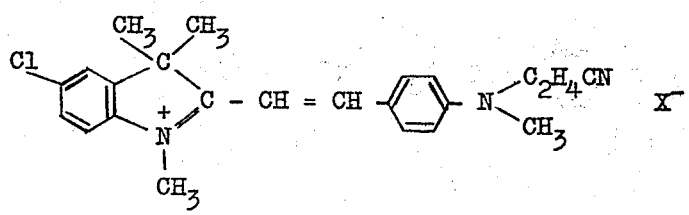
and
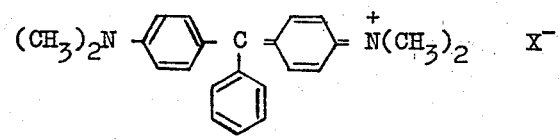
Dye Combination (5):
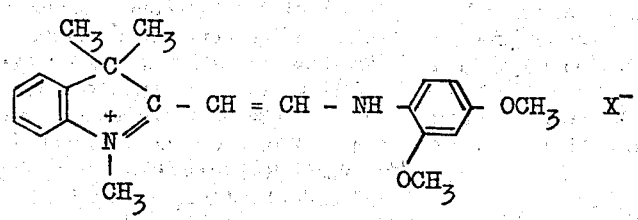
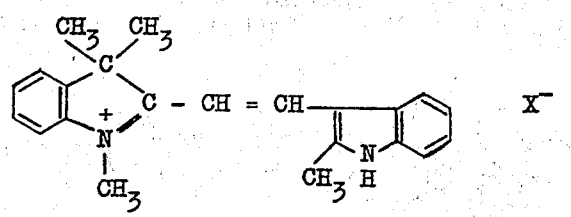

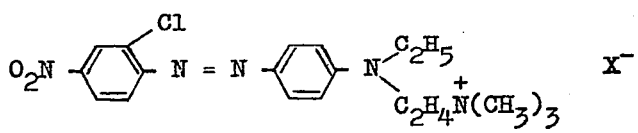

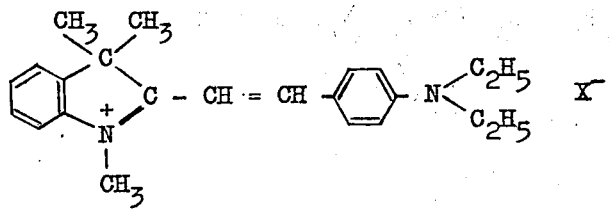

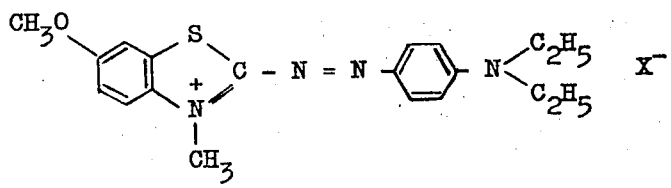

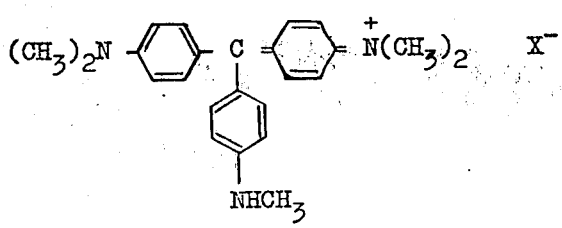

and

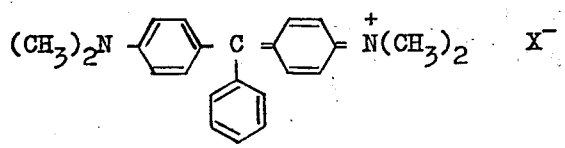

In the above formulae, X⁻ represents an anion.

The above-described mixed dyes are very poor in exhaustion as stated above and hence do not result in a deep black color and in addition result in greatly staining fibers other than the basic dyeable polyester fibers when yarn fabrics of blends of these fibers are dyed with such mixed dyes.

SUMMARY OF THE INVENTION

As the result of various investigations of dyeing cationic dye-dyeable polyester such as "Dacron T-64" (made by E. I. du Pont de Nemours and Co.) a deep black, it has been discovered that when polyester fibers are dyed with a dyeing bath containing a combination of five kinds of dyes represented by the general formulae (A), (B), (C), (D), and (E) or (A), (B), (C), (D), and (F), an excellent black color is obtained.

That is, the present invention provides a black dyeing process of basic dyeable polyester fibers which comprises contacting the polyester fibers with a dyeing bath containing a combination of five kinds of dyes, the combination comprising 1. at least one dye of the general formula (A),

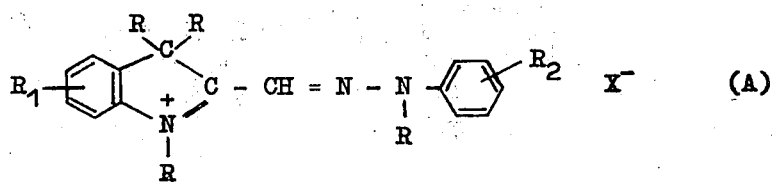

wherein R, each of which may be the same or different, each represents a methyl group or an ethyl group; $R_1$ represents a hydrogen atom or a halogen atom; $R_2$ represents a hydrogen atom, a lower alkyl group having 1 to 3 carbon atoms or a lower alkoxy group having 1 to 3 carbon atoms; and $X^-$ represents an anion;

2. at least one dye of the general formula (B),

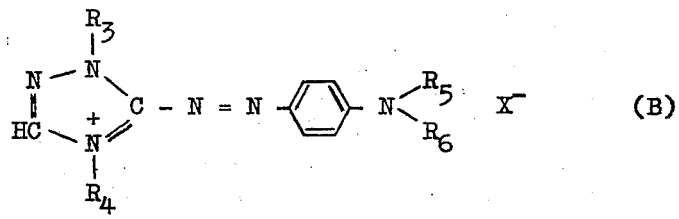

(B)

wherein $R_3$, $R_4$, $R_5$, and $R_6$, which may be the same or different, each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a hydroxy group or a lower alkoxy group having 1 to 2 carbon atoms; and $X^-$ represents an anion;

3. at least one dye of the general formula (C),

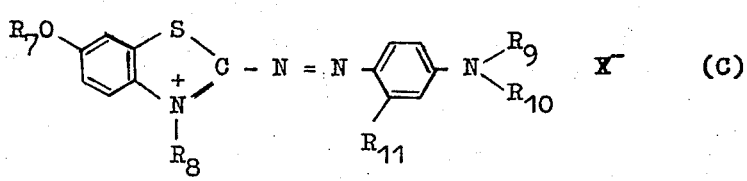

(C)

wherein $R_7$ represents a lower alkyl group having 1 to 2 carbon atoms; $R_8$ represents a lower alkyl group having 1 to 3 carbon atoms, which may be substituted with a halogen atom, a carbamoyl group, a hydroxy group, or a lower alkoxy group having 1 to 2 carbon atoms; $R_9$ and $R_{10}$ each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a lower alkoxy group having 1 to 2 carbon atoms, or a hydroxy group; $R_{11}$ represents a hydrogen atom or a lower alkyl group having 1 to 3 carbon atoms; and $X^-$ represents an anion;

4. at least one dye of the general formula (D),

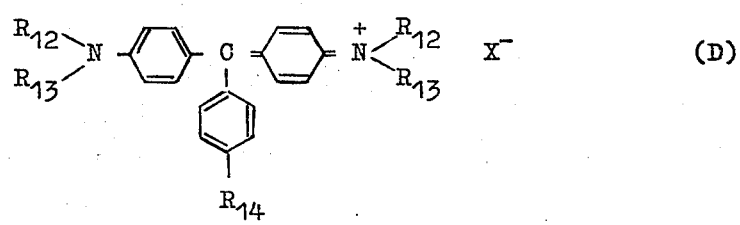

(D)

wherein $R_{12}$ and $R_{13}$ each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a hydroxy group, or a cyano group; $R_{14}$ represents a hydrogen atom or an amino group, which may be substituted with an alkyl group having 1 to 3 carbon atoms or a phenyl group; and $X^-$ represents an anion; and 5. at least one dye of the general formula (E) or (F), the general formula (E) being represented by

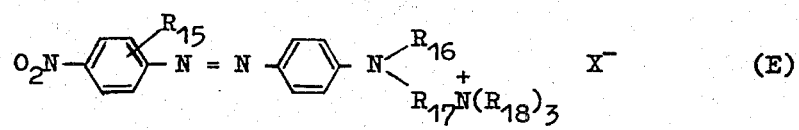

(E)

wherein $R_{15}$ represents a hydrogen atom, a halogen atom, or a cyano group; $R_{16}$ represents a lower alkyl group having 1 to 3 carbon atoms or an aralkyl group in which the aryl moiety is phenyl or naphthyl and in which the alkyl moiety has 1 to 2 carbon atoms; $R_{17}$ represents an alkylene group having 1 to 3 carbon atoms; $R_{18}$ represents a lower alkyl group having 1 to 3 carbon atoms; and $X^-$ represents an anion; and the general formula (F) being represented by

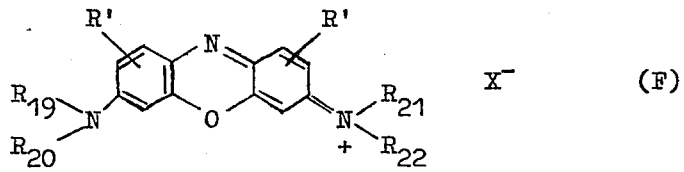 (F)

wherein $R_{19}$, $R_{20}$, $R_{21}$, and $R_{22}$, which may be the same or different, each represents a hydrogen atom, a lower alkyl group having 1 to 3 carbon atoms, or a phenyl group; R', each of which may be the same or different, represents a hydrogen atom, a lower alkyl group having 1 to 3 carbon atoms, or a halogen atom; and $X^-$ represents an anion.

Furthermore, when yarn fabrics of blends of, e.g., "Dacron T-64" fibers and non-modified polyester fibers such as "Tetoron" (made by Toray Co., Ltd.) or other fibers such as wool, cotton, etc., are dyed using the dyeing process of this invention, only the basic dyeable polyester fibers such as Dacron T-64 fibers are dyed a quite deep black as in the case of dyeing 100% basic dyeable polyester fibers and fibers other than the basic dyeable polyester fibers in the blend of fibers, such as nonmodified polyester, wool, cotton, etc., remain white without staining such fibers.

DETAILED DESCRIPTION OF THE INVENTION

As described above, the black dyeing bath used in the process of this invention contains five kinds of specific dyes and if the dyeing bath lacks even one of the five kinds of dyes specified in this invention, modified polyester fibers are not dyed a deep black.

The dyes represented by general formula (A) are known as dyes for polyacrylic fibers and can be prepared by the process as disclosed in, for example, West German Pat. No. 1,083,000.

Specific examples of dyes represented by general formula (A) are as follows:

Dye (A)-1:

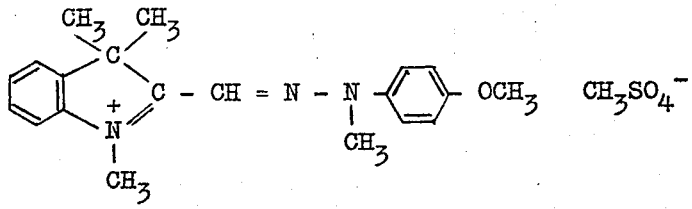

Dye (A)-2:

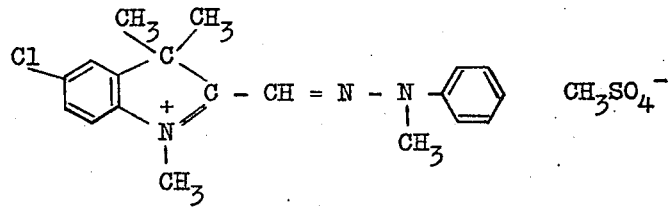

Dye (A)-3:

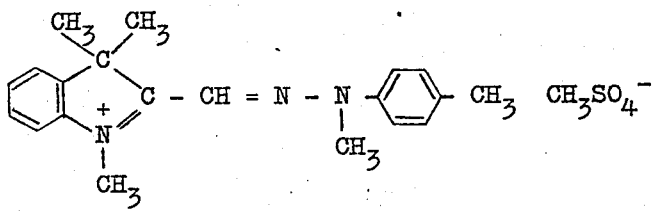

The dyes represented by general formula (B) are also known as dyes for polyacrylic fibers and can be prepared by the processes as disclosed in, for example, West German Pat. Nos. 1,044,023 and 1,077,808.

Specific examples of dyes represented by general formula (B) are as follows:

Dye (B)-1:
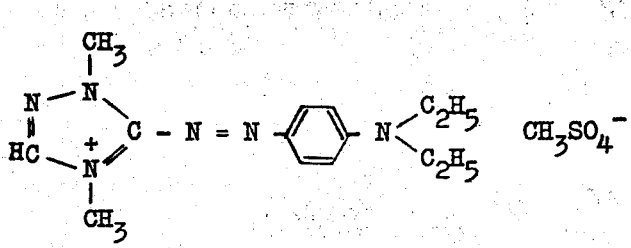
Dye (B)-2:
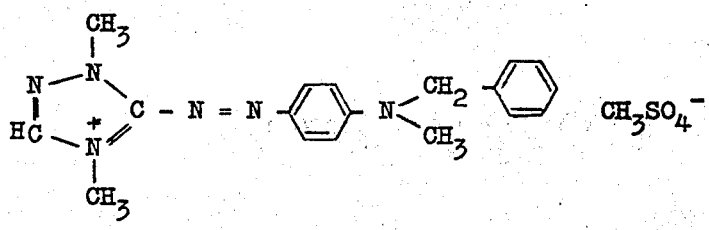
Dye (B)-3:
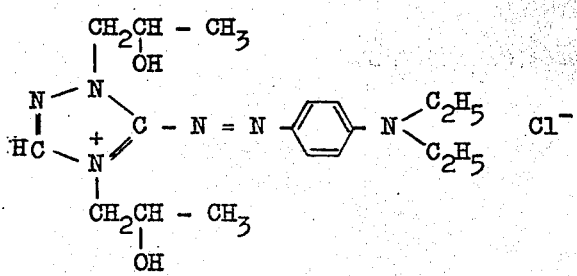
The dyes represented by general formula (C) are also known as dyes for polyacrylic fibers and can be prepared by the processes disclosed in, e.g., West German Pat. Nos. 1,044,023 and 1,050,940 and Japanese Patent No. 15791/71.
Specific examples of the dyes represented by formula (C) are as follows:
Dye (C)-1:
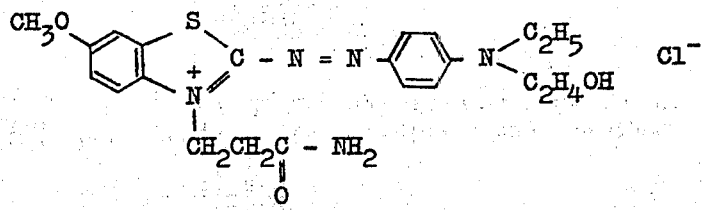
Dye (C)-2:
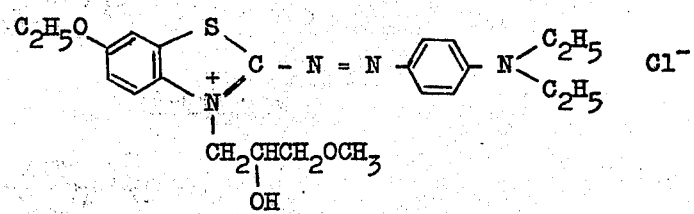
Dye (C)-3:
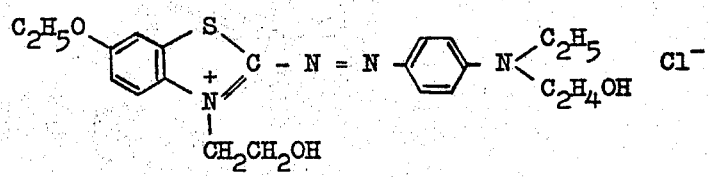

The dyes represented by general formula (D) are known as basic dyes and specific examples of dyes represented by general formula (D) are as follows:

Dye (D)-1: Malachite green

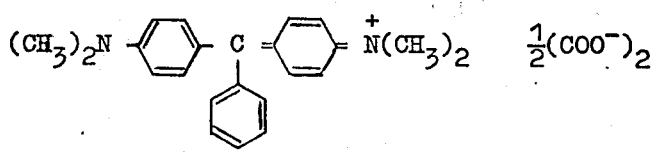

Dye (D)-2: Diamond green

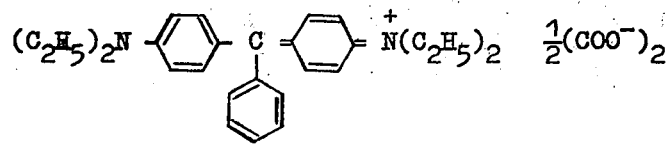

Dye (D)-3: Methyl violet

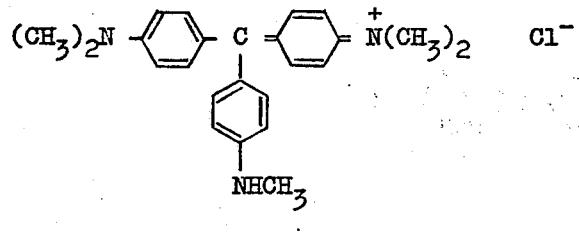

Dye (D)-4: Crystal violet

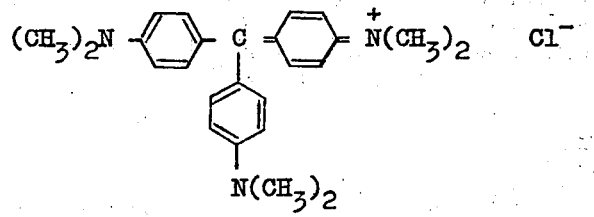

The dyes represented by general formula (E) are also known as dyes for polyacrylic fibers and can be prepared by the process disclosed in, for example, West German Pat. No. 1011396.

Specific examples of dyes represented by general formula (E) are as follows:

Dye (E)-1:

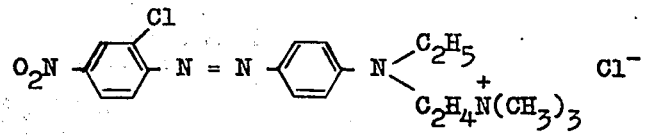

Dye (E)-2:

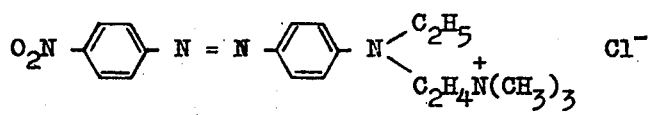

Dye (E)-3:

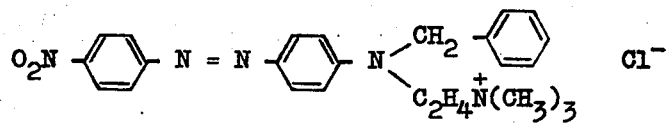

Also, specific examples of dyes represented by general formula (F) are as follows:

Dye (F)-1:

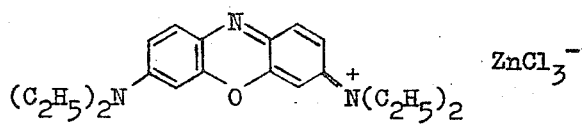

Dye (F)-2:

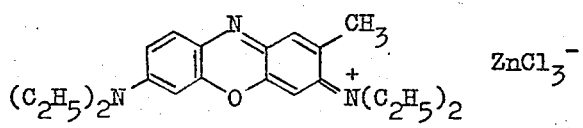

Dye (F)-3:

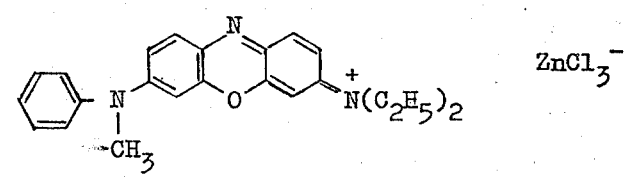

The above described dyes of the general formula (F) are described in British Pat. No. 751,150.

The black dyeing bath used in this invention contains, as the necessary components, at least one dye of each of the general formulae (A), (B), (C), (D), and (E) or of each of the general formulae (A), (B), (C), (D), and (F) but, if desired, other cationic dyes can be incorporated in the dyeing bath for toning.

Moreover, in the present invention, the five kinds of dyes represented by general formulae (A), (B), (C), (D), and (E) or (A), (B), (C), (D), and (F) can, of course, be blended initially and the blend can be used as a blended black dye. Although the amount of each dye blended varies depending upon the color, shade, tinting strength and the like of the dyes, at least 2.0% by weight of each of the kinds of dyes based on the total weight of the dyes blended is usually suitable.

The term "basic dyeable polyester fiber" means a polyester fiber which has been modified by introducing an acid group such as a sulfonic acid group into polyester so that the fibers become dyeable with cationic dyes. Specific examples of basic dyeable polyester fibers are Dacron T-64, Dacron T-65, Dacron T-62, Dacron T-89, Dacron T-92, and Dacron T-161 (made by E. I. du Pont Nemours and Co.), Trevira 440 (made by Hystron), and Kodel 511 (made by Tennessee Eastman, Inc.).

The dyeing can be conducted using a so-called high temperature dyeing or carrier dyeing method. That is, high temperature dyeing can be effected at a temperature of about 115° to 130°C for about 40 to 100 minutes, with the pH of the bath being adjusted to about 3.5 to 5.0 using a buffer such as sodium acetate and acetic acid. In order to prevent decomposition of the basic dyeable polyester fibers during the dyeing, for example, anhydrous sodium sulfate can be added to the dye bath in an amount of about 2.0 to 6.0 g per liter of the dye bath. Carrier dyeing can be effected at a temperature of about 100° to 105°C for about 60 to 120 minutes using a carrier such as biphenyl, butyl benzoate or o-phenylphenol which are dispersed using a non-ionic surface active agent, with the pH of the bath being adjusted to about 3.5 to 5.0 using a buffer such as sodium acetate and acetic acid. The bath ratio in both dyeing methods is usually about 1:10 to 1:150. The fibers dyed can be after-treated in a conventional manner to obtain a black dyed product.

The present invention will be explained in greater detail below with reference to the following examples, which are given only for the purposes of illustration and are not to be interpreted as limiting. In the examples, all parts, percents, ratios and the like are by weight unless otherwise indicated.

EXAMPLE 1

The following dyes were dissolved in 1000 parts by weight of hot water:

|  | Parts |
| --- | --- |
| Dye (A)-1 | 0.8 |
| Dye (E)-2 | 3.4 |
| Dye (B)-2 | 2.0 |
| Dye (C)-3 | 4.45 |
| Dye (D)-1 | 3.2 |

The solution prepared was diluted with 50,000 parts of water and then 10 parts of acetic acid and 5 parts of anhydrous sodium acetate were added to the solution to prepare a dye bath.

Then, 1000 parts by weight of a sliver of Dacron T-64 was immersed in the dye bath prepared above and after increasing the temperature of the bath to 120°C over a period of 40 minutes with stirring, the sliver was dyed for 60 minutes at that temperature. The sliver was, then, washed with water and dried.

Thus, the sliver of Dacron T-64 was dyed a deep and fast black.

EXAMPLE 2

By following the same dyeing procedure as described in Example 1 while adding additionally 0.3 parts by weight of the dye having the following structure to the dyeing bath as a toning dye, the sliver of Dacron T-64 was dyed a clear-greenish deep black.

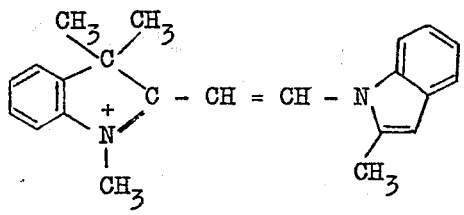

EXAMPLE 3

A dye bath was prepared by dissolving the following dyes as described in Example 1.

|   | Parts |
|---|---|
| Dye (A)-3 | 0.9 |
| Dye (E)-1 | 3.5 |
| Dye (B)-3 | 1.8 |
| Dye (C)-2 | 4.5 |
| Dye (D)-2 | 3.3 |

Then, staple fibers of Dacron T-92 were dyed in the dye bath as described in Example 1, whereby the fibers were dyed a deep black.

EXAMPLE 4

By following the same dyeing procedure as described in Example 1 using a dye bath containing the following dyes, Dacron T-64 was also dyed a deep black.

|   | Parts |
|---|---|
| Dye (A)-1 | 0.3 |
| Dye (A)-2 | 0.3 |
| Dye (E)-2 | 3.3 |
| Dye (B)-2 | 2.4 |
| Dye (C)-3 | 3.2 |
| Dye (D)-1 | 5.2 |

EXAMPLE 5

The following dyes were dissolved in 1000 parts by weight of hot water.

|   | Parts |
|---|---|
| Dye (A)-1 | 4.1 |
| Dye (B)-2 | 3.3 |
| Dye (C)-2 | 1.5 |
| Dye (F)-2 | 1.2 |
| Dye (D)-1 | 2.8 |
| Dye (D)-3 | 0.6 |

The solution of the dyes thus prepared was diluted with 50,000 parts by weight of water and then 10 parts of acetic acid and 5 parts of anhydrous sodium acetate were added to the solution to prepare a dye bath.

Then, 2000 parts by weight of a yarn fabric of a blend of 50% Dacron T-92 (basic dyeable type) and 50% Dacron T-56 (nonmodified type polyester) was immersed in the dye bath and after increasing the temperature of the bath to 120°C over a period of 40 minutes with stirring, the fabric was dyed for 60 minutes at that temperature. The fabric thus dyed was washed with water and dried.

With the dyeing procedure, Dacron T-92 of the blended yarn fabric was dyed a deep black, while the Dacron T-56 thereof was neither dyed nor stained, and thus a black and white dyed fabric having a quite high contrast was obtained.

EXAMPLE 6

The following dyes were dissolved in 1000 parts by weight of hot water.

|   | Parts |
|---|---|
| Dye (A)-1 | 4.0 |
| Dye (F)-1 | 0.9 |
| Dye (B)-2 | 3.2 |
| Dye (C)-3 | 1.4 |
| Dye (D)-1 | 3.1 |
| Dye (D)-3 | 0.7 |

The solution of the dyes thus prepared was diluted with 50,000 parts by weight of water and then 10 parts of acetic acid and 5 parts of anhydrous sodium acetate were added to the solution to provide a dye bath.

Then, 1000 parts by weight of a sliver of Dacron T-64 was immersed in the dye bath and after increasing the temperature of the bath to 120°C over a period of 40 minutes with stirring, the sliver was dyed for 60 minutes at that temperature. Thereafter, the dyed sliver was washed with water and dried.

Thus, the sliver of Dacron T-64 was dyed a deep and fast black.

EXAMPLE 7

By following the same dyeing procedure as described in Example 6 using the dye bath as described in Example 6 containing additionally 0.3 parts by weight of the dye having the following structure as a toning dye, the sliver of Dacron T-64 was dyed a clear-greenish deep black.

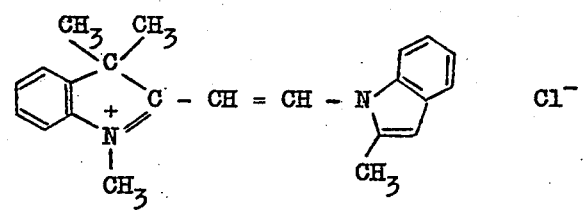

EXAMPLE 8

Staple fibers of Dacron T-92 were dyed as described in Example 6 using a dye bath containing the following dyes.

|   | Parts |
|---|---|
| Dye (A)-3 | 3.6 |
| Dye (F)-1 | 1.1 |
| Dye (B)-3 | 4.0 |
| Dye (C)-2 | 1.4 |
| Dye (D)-2 | 3.5 |

Thus, the Dacron T-92 was dyed a deep black.

While the invention has been described in detail and with reference to specific embodiments thereof, it will be apparent to one skilled in the art that various changes and modifications can be made therein without departing from the spirit and scope thereof.

What is claimed is:

1. A process for dyeing basic dyeable polyester fibers a deep black comprising contacting said polyester fibers with a dye bath containing a combination of five kinds of dyes, the combination comprising 1. at least one dye of the general formula (A),

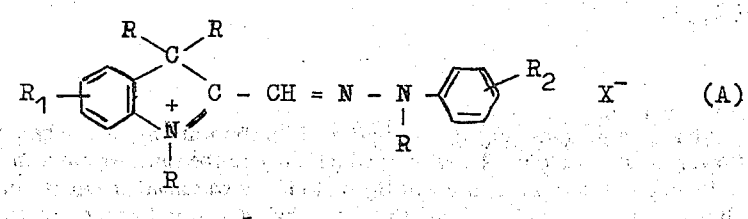

wherein R, each of which may be the same or different, represents a methyl group or an ethyl group; $R_1$ represents a hydrogen atom or a halogen atom; $R_2$ represents a hydrogen atom, a lower alkyl group having 1 to 3 carbon atoms, or a lower alkoxy group having 1 to 3 carbon atoms; and $X^-$ represents an anion;

2. at least one dye of the general formula (B),

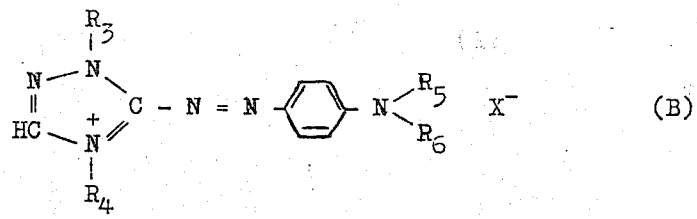

wherein $R_3$, $R_4$, $R_5$, and $R_6$, which may be the same or different, each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a hydroxy group, or a lower alkoxy group having 1 to 2 carbon atoms; and $X^-$ represents an anion;

3. at least one dye of the general formula (C),

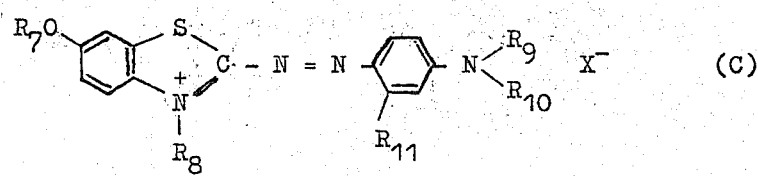

wherein $R_7$ represents a lower alkyl group having 1 to 2 carbon atoms; $R_8$ represents a lower alkyl group having 1 to 3 carbon atoms, which may be substituted with a halogen atom, a carbamoyl group, a hydroxy group, or a lower alkoxy group having 1 to 2 carbon atoms; $R_9$ and $R_{10}$ each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a lower alkoxy group having 1 to 2 carbon atoms, or a hydroxy group; $R_{11}$ represents a hydrogen atom or a lower alkyl group having 1 to 3 carbon atoms; and $X^-$ represents an anion;

4. at least one dye of the general formula (D),

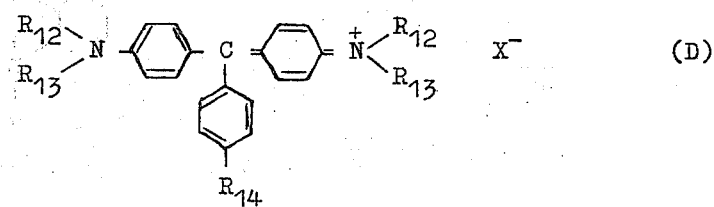

wherein $R_{12}$ and $R_{13}$ each represents a lower alkyl group having 1 to 3 carbon atoms or an aralkyl group in which the aryl moiety is phenyl or naphthyl and in which the alkyl moiety has 1 to 2 carbon atoms, each of which group may be substituted with a halogen atom, a hydroxy group, or a cyano group; $R_{14}$ represents a hydrogen atom or an amino group, which may be substituted with an alkyl group having 1 to 3 carbon atoms or a phenyl group; and $X^-$ represents an anion; and 5. at least one dye of the general formula (E) or (F), the general formula (E) being represented by

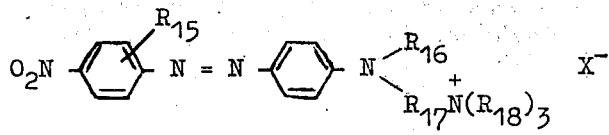

wherein $R_{15}$ represents a hydrogen atom, a halogen atom, or a cyano group; $R_{16}$ represents a lower alkyl group having 1 to 3 carbon atoms or an aralkyl group in which the aryl moiety is phenyl or naphthyl and in which the alkyl moiety has 1 to 2 carbon atoms; $R_{17}$ represents a lower alkylene group having 1 to 3 carbon atoms; $R_{18}$ represents a lower alkyl group having 1 to 3 carbon atoms; and $X^-$ represents an anion; and the general formula (F) being represented by

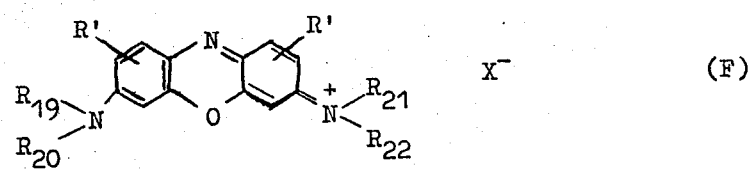

wherein $R_{19}$, $R_{20}$, $R_{21}$, and $R_{22}$, which may be the same or different, each represents a hydrogen atom, a lower alkyl group having 1 to 3 carbon atoms, or a phenyl group; R', each of which may be the same or different, represents a hydrogen atom, a lower alkyl group having 1 to 3 carbon atoms, or a halogen atom; and $X^-$ represents an anion, wherein said dye bath contains at least 2.0% by weight of each of the dyes of formulas (A) – (E).

2. The process according to claim 1, wherein the dye of the general formula (A) is

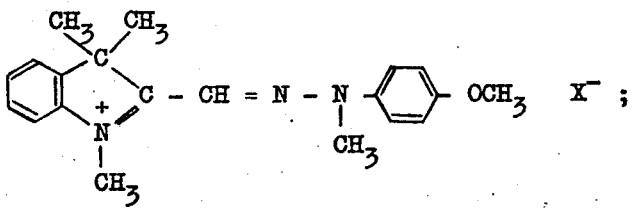

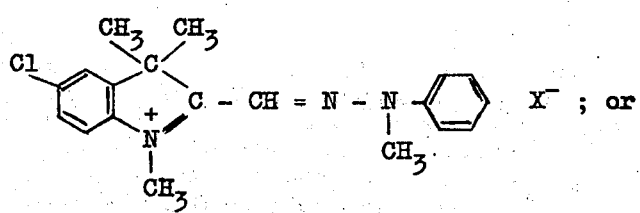

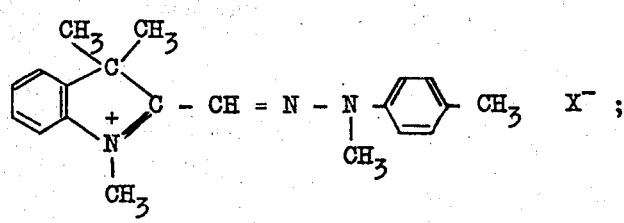

wherein X⁻ is as defined in claim 1.
3. The process according to claim 1, wherein the dye of the general formula (B) is
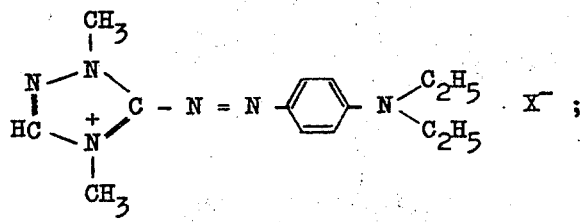
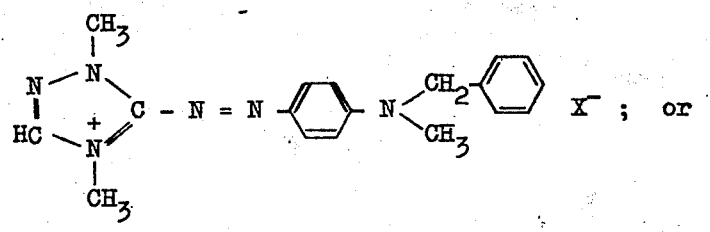
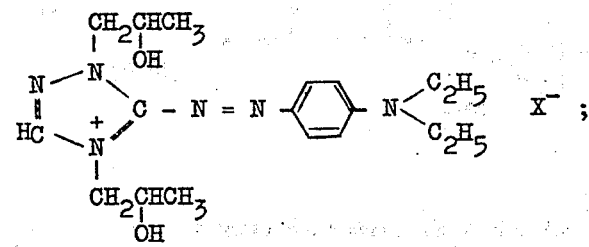
wherein X⁻ is as defined in claim 1.
4. The process according to claim 1, wherein the dye of the general formula (C) is
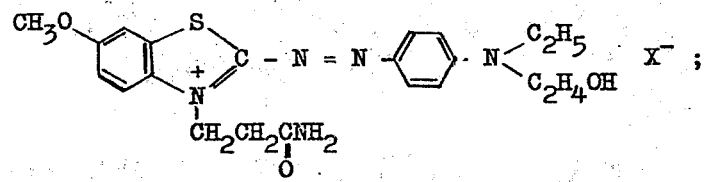
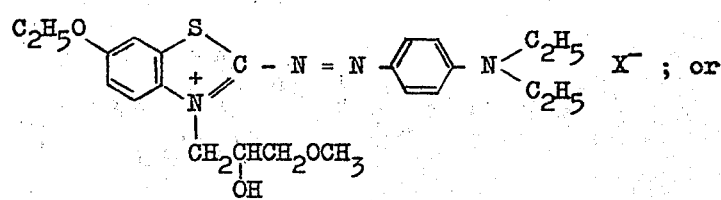
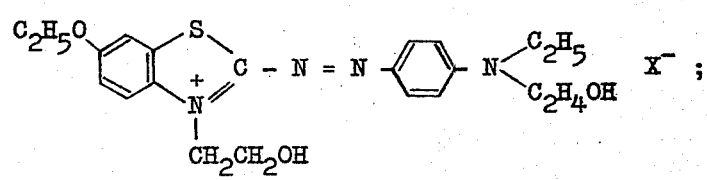

wherein X⁻ is as defined in claim 1.

5. The process according to claim 1, wherein the dye of the general formula (D) is

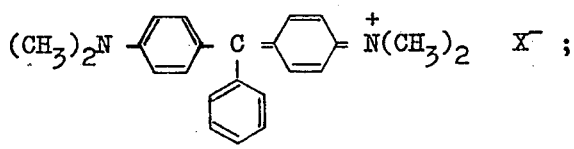

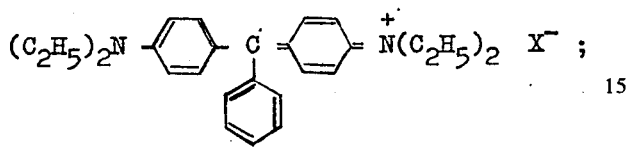

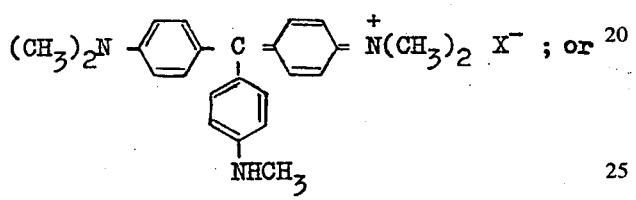

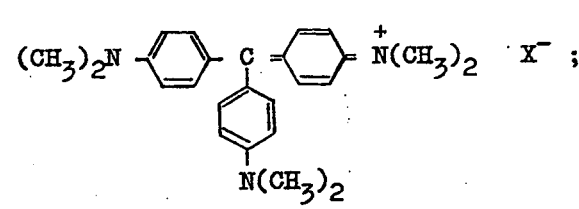

wherein X⁻ is as defined in claim 1.

6. The process according to claim 1, wherein the dye of the general formula (E) is

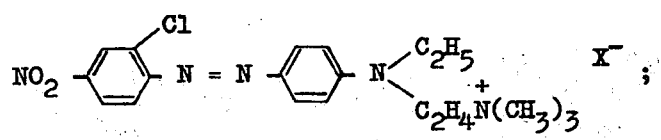

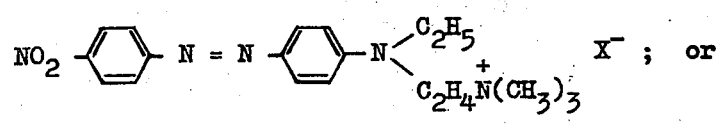

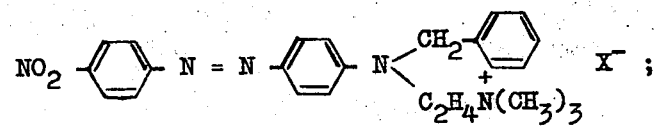

wherein X⁻ is as defined in claim 1.

7. The process according to claim 1, wherein the dye of the general formula (F) is

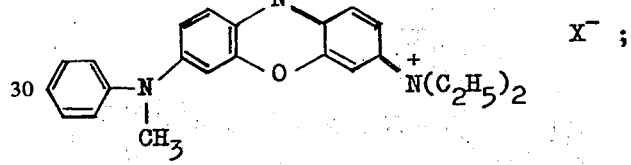

wherein X⁻ is as defined in claim 1.

8. A basic dyeable polyester fiber dyed according to the process of claim 1.

* * * * *

UNITED STATES PATENT AND TRADEMARK OFFICE
CERTIFICATE OF CORRECTION

PATENT NO. : 3,948,598
DATED : April 6, 1976
INVENTOR(S) : Tetsuo OKANIWA et al

It is certified that error appears in the above-identified patent and that said Letters Patent are hereby corrected as shown below:

IN THE ABSTRACT:

Lines 9 to 10, delete "a Nitrobenzeneazo-substituted aminobenzene", and insert therefor --at least one of nitro-benzeneazo-substituted aminobenzene and oxazine dye--.

Signed and Sealed this

Twentieth Day of July 1976

[SEAL]

Attest:

RUTH C. MASON
Attesting Officer

C. MARSHALL DANN
Commissioner of Patents and Trademarks